Aug. 18, 1953     T. J. R. DIBDIN     2,649,050
CENTRIFUGAL PUMP
Filed April 9, 1951
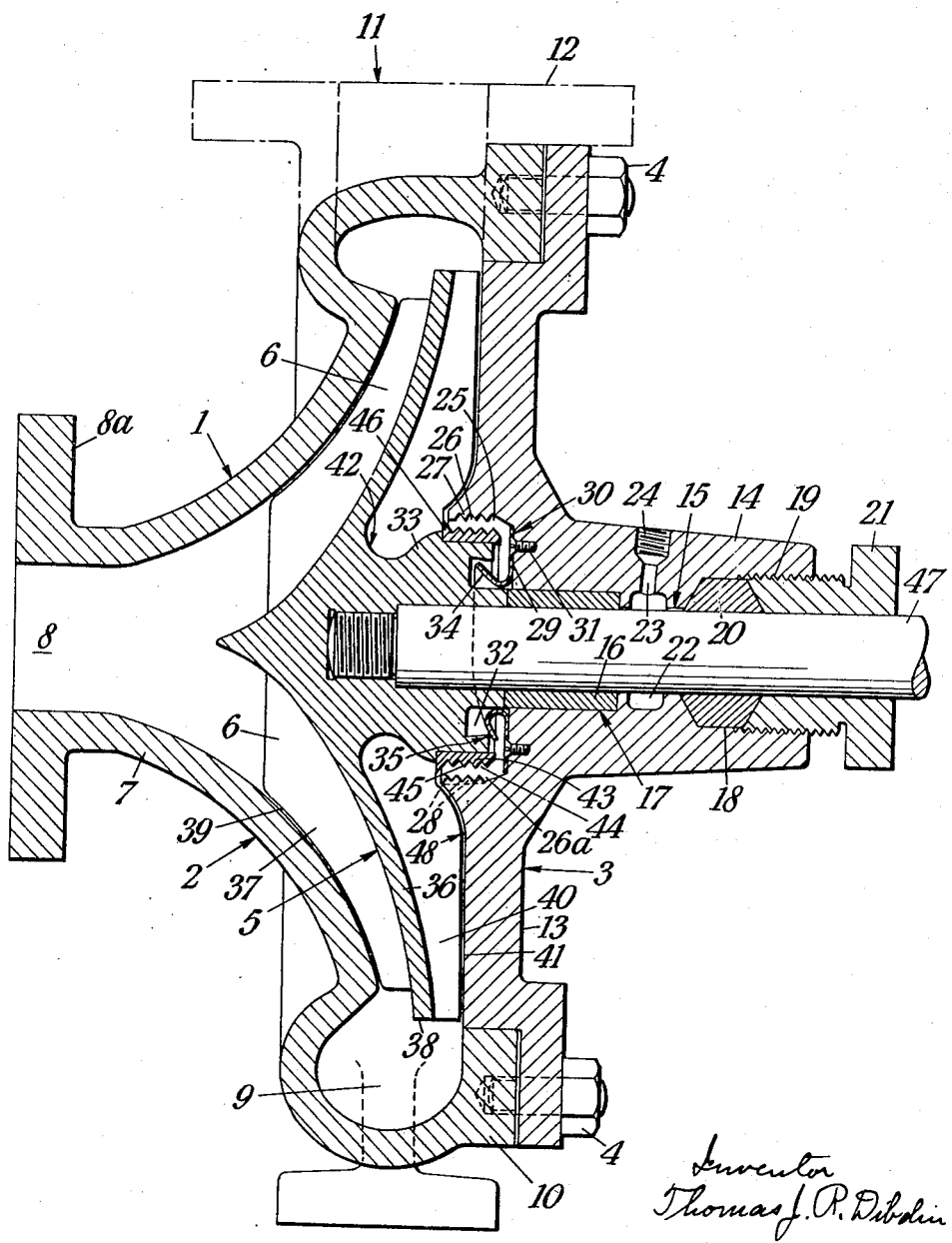
Inventor
Thomas J. R. Dibdin
by Benj. T. Rauber
his attorney Patented Aug. 18, 1953

2,649,050

UNITED STATES PATENT OFFICE 2,649,050

CENTRIFUGAL PUMP

Thomas James Rimbault Dibdin, Maghull, Liverpool, England, assignor to Dunlop Tire and Rubber Corporation, Buffalo, N. Y., a corporation of New York Application April 9, 1951, Serial No. 220,069
In Great Britain February 2, 1950

11 Claims. (Cl. 103—103)

My invention relates to centrifugal pumps and more particularly to centrifugal pumps for pumping rubber latex or other suspensions, for example, the aqueous pulps used in the manufacture of paper.

Centrifugal pumps heretofore used for pumping rubber latex and the like comprised a cylindrical casing having an outlet for liquid in its periphery and an inlet on its axis and an impeller rotatable in the casing by means of a shaft co-axial with the inlet and carried in a bearing mounted in the side of the casing remote from the inlet. The impeller comprised an annular plate integral with a hub which was fixed to one end of the shaft and a plurality of blades integral with the plate and projecting towards the front face of the casing i. e. the face containing the inlet. A stuffing box assembly was provided in the casing adjacent the side of the bearing remote from the inlet and co-axial with the shaft.

To prevent the latex from flowing along the shaft and entering the stuffing box packing where it would coagulate and bring the pump to a standstill, means were provided whereby water could be supplied to the inside face of the stuffing box packing, the water pressure being sufficient to prevent the flow of latex into the packing and to cause a flow of water through the bearing into the casing. The amount of water passing into the pump casing in these prior pumps might be as much as fifty gallons per hour, thus considerably diluting the latex during delivery, which is undesirable.

My invention provides a centrifugal pump which requires little or no sealing water.

According to my invention a centrifugal pump comprises a casing, a fluid inlet located centrally on one side of the casing, a fluid outlet in the periphery of the casing, a shaft projecting into the casing and rotatable in a bearing attached to the casing on its side remote from the inlet, an impeller rigidly mounted on the shaft and comprising a substantially radially extending annular plate portion provided on both faces with blades extending substantially axially to leave only a small clearance between their edges and the side walls of the casing and a hub portion one end of which projects into a recess formed in the side wall of the casing adjacent to the bearing, the portion of the side wall surrounding the recess being curved inwardly towards the impeller plate and a portion of the hub adjacent to the recess being curved inwardly towards the said plate, whereby during pumping liquid approaching the bearing is directed by the inwardly curved portion of the wall and hub towards the roots of the blades.

Preferably the impeller hub is provided with means for centrifugally throwing liquid, which may be approaching the bearing along the surface of the hub, into a plurality of grooves formed in the recess. The liquid is conducted from the grooves into the pump casing and into contact with the blades which then throw the liquid towards the periphery of the casing so as to rejoin the main stream of liquid with which it flows through the pump outlet.

A pump in accordance with the invention will run continuously without any flow of water to the stuffing box packing though it is necessary to prime the pump with water before starting up. Preferably, therefore, the pump is provided with an annular chamber which is located co-axially with the shaft between the inside face of the stuffing box packing and the bearing and which can be connected by means of a pipe to a water supply.

A preferred embodiment of the invention is illustrated by way of example in the accompanying drawing which is a cross-sectional side elevation of a centrifugal pump suitable for pumping latex.

The pump 1 comprises an impeller casing which is formed in two pieces comprising side walls 2 and 3 joined together by means of bolts 4 along a plane disposed at right angles to the axis of an impeller 5 which is rotatably mounted in a recess or impeller chamber 6 formed in the half, 2, of the casing.

The recessed half, 2, of the casing is provided with a converging neck portion 7 forming an inlet 8 and terminating in a flange 8ª. An annular peripheral portion 9 is provided adjacent to the mounting flange 10. Latex, during operation of the pump, is drawn through the neck portion 7 and into the peripheral portion 9 to be delivered through an outlet 11, shown in broken lines, the outlet being located in the peripheral portion 9 of the casing substantially tangential to the impeller 5. The outlet terminates in a flange 12.

The other half of the casing, hereinafter referred to as the back plate, 3, comprises a radially extending flange portion or bearing side wall 13 and a substantially cylindrical portion 14 coaxial with the flange 13 and projecting from the side of the plate remote from the recess 6. The cylindrical portion 14 is provided with a coaxial bore 15 and a graphite impregnated bearing bush 16 is firmly fitted into a counterbore 17 formed in the bore 15 at its end nearest to the recess 6. The end of the cylindrical portion 14 remote from the bearing 17 is provided with a stuffing box 18 which is provided with a screw thread 19. The stuffing box houses the packing 20 and an annular gland 21 is screwed into the screw-thread 19 and can be adjusted in order to apply pressure to the packing. An annular recess 22 is formed coaxially in the bore 15 and is located between the bearing 16 and the stuffing box, the recess 22 being provided with a transverse hole 23 provided at its outer end with a screw-threaded counterbore 24, in order that a water pipe may be connected thereto. A recess 25 is formed in the back plate 3 coaxial with the bore 15 and on its side remote from the stuffing box. The peripheral surface of the recess is provided with four annular grooves 26 spaced apart equally across the peripheral surface. The walls of adjacent grooves 26 meet to form knife edges 27. An interconnecting groove 28 is formed across the recess 25 and interconnects the grooves 26 at the lowest portion of their periphery. The wall of the back plate or bearing side wall 3 surrounding the recess 25 is provided with an inwardly curved portion 48 the function of which will hereinafter be described.

A thin mild steel shroud or annular deflector plate 29 is rigidly attached to the radially extending wall 30 of the recess 25 by means of the screws 31. The shroud 29 is annular in shape and roughly of U-shaped cross-section and projects into the upper part of a recess 32 formed in a hub 33 forming part of the impeller 5. The portion 34 of the shroud 29 at its lower peripheral portion curves away from the recess 32 so that it contacts the lip 35 and overlaps into the recess 25.

The impeller will now be more particularly described. The hub 33 is provided with a substantially radially extending impeller plate 36 formed integrally with the hub, the hub and plate being curved towards the inlet 8 so as to conform to the profile of the neck 7. Six impeller blades 37 are formed integrally with the plate and hub and project from the inlet side thereof. These blades extend from the hub 33 and terminate just short of the periphery 38 of the annular plate 36. The blades are provided along the sides with a contour conforming to that of the adjacent part of the casing, a clearance 39 of about .03 of an inch being provided between the blades and the casing. A second set of six impeller blades 40 is formed integrally with the plate and the hub on its other side, the blades extending radially up to the periphery 38 of the plate 36 so that the tips of these blades are located at greater distance measured radially from the impeller axis than the tips of the blades 37. The sides of the blades 40 are provided with a contour conforming to that of the adjacent part of the casing, a clearance 41 of about .03 of an inch being provided between the blades and the casing.

The impeller hub 33 is provided with an inwardly curved portion 42 and the end of the hub located within the recess 25 has rigidly mounted thereon a ring 43 now to be described. The ring is provided on its outer peripheral surface with four annular grooves 44, the walls of adjacent grooves meeting to form knife edges 45, the distance between the grooves being the same as the distance between the grooves provided on the periphery of the recess 25. The position of the ring 43 on the hub is such that its knife edges 45 are located radially in line with the grooves 26 formed in the recess. A knife edge 46 is formed at the inner end of the ring 43 and projects outside the recess 25.

The impeller is rigidly mounted on a shaft 47 rotatable in the bearing 16 and projecting through the bore 15, the stuffing box 18 and the gland 21, its outer end being connected to means for driving the impeller which is not illustrated in the drawings. The driving means is provided with means for axially locating the impeller so that the clearances between the impeller blades and the casing are maintained.

The operation of the pump just described will now be outlined. The flange portion 8ᵃ of the pump inlet has a latex supply pipe rigidly attached thereto, the supply pipe being provided with a stop valve. A latex delivery pipe is attached to the outlet flange 12 and a water supply pipe is connected to the screw-threaded counterbore 24 provided in the cylindrical portion 14.

Before starting the pump the stop valve is closed and water is supplied to the annular chamber 22 from which it flows through the bearing 16 into the recess 6 formed in the pump casing. When the recess is filled the water supply is cut off.

The pump is then started and simultaneously the stop valve is opened. The impeller blades 37 throw water centrifugally outwards and latex is drawn in through the inlet, flows down the neck 7 into contact with the blades 37 to be thrown centrifugally out of the outlet 11. Simultaneously the blades 40 throw the water centrifugally outwards, evacuation of this water causing a vacuum to form in the recess 6 adjacent to these blades and in the recess 25.

As the latex is thrown by the blades 37 into the annular recess 9 it flows into contact with the blades 40 which throw it back into the recess 9 to be eventually delivered through the outlet 11. Due to the greater radial extension of the blades 40 relative to the blades 37, the blades 40 impart a greater centrifugal force to the latex than the blades 37 and hence a greater fluid pressure is set up in the region of the recess 9 adjacent to the blades 40 than elsewhere in the recess. It is thus ensured that latex will flow away from the blades 40 towards the blades 37 with the result that there is less tendency for latex to flow into the clearance 41 towards the bearings. Some latex, however, passes into the clearance 41 and flows down the clearance and along the inwardly curved portion 48 which directs the latex into the inwardly curved portion 42 formed on the hub so that the latex flows into the contact with the roots of the blades 40. The latex is then flung centrifugally outwards into the recess 9 by the blades 40. Some of the latex during its passage from the curved portion 48 to the curved portion 42 may be deposited on the hub adjacent to the large knife edge 46. This latex is flung centrifugally outwards by the knife edge 46 into the spaces formed between the blades 40 to be delivered by the blades into the recess 9.

Latex may also flow onto the knife edges 45 to be thrown thereby into the grooves 26 from which it flows into the inter-connecting groove 28 and from there into the spaces formed between the blades to be delivered by the blades into the recess 9.

Should any drops of latex, by splashing or other means, pass beyond the ring 43 they collect on the surface of the shroud 29 and run off the shroud into the groove 26ᵃ and through the inter-connecting groove 28 to be delivered into the annular recess 9 as before.

The latex is thus prevented by the means just described from entering the bearing 16 and the pump will run continuously without any sealing water.

It may be found an advantage, however, to allow a small trickle of water to flow from the annular recess 22 into contact with the packing 18 located in the stuffing box. During rotation this small flow of water assists in lubricating the packing 18 and keeping it cool. In addition to flowing through the packing 18, a small amount of water will flow through the bearing and into the casing, though the amount of water need not exceed about 2% of that required for the known type of pump described in the early part of the specification and will cause negligible dilution of the latex during pumping.

Having described my invention, what I claim is:

1. A centrifugal pump comprising a casing having an inlet side wall with an inlet centrally thereof, a bearing side wall opposite and spaced from said inlet side wall and a peripheral off-take wall forming an impeller chamber between said side walls, said bearing side wall having a bearing centrally thereof and a recess between said bearing and said impeller chamber, a shaft extending through said bearing and recess into said impeller chamber and an impeller in said impeller chamber comprising a hub mounted on said shaft within said impeller chamber and extending into said recess a plate mounted rigidly at its center on said hub and in spaced relation to said side walls and having blades extending from its opposite faces to a slight clearance to said side walls and radially outwardly from said hub, the bearing side wall being curved towards the impeller plate as it approaches said recess and the adjacent edges of said blades being curved complementarily to direct fluid moving radially inwardly of said bearing side wall to the blades of said impeller.

2. The centrifugal pump of claim 1 in which said inlet side wall tapers to said inlet and said impeller plate is tapered centrally toward said inlet to form a curved annular passage from said inlet to said peripheral off-take wall.

3. The centrifugal pump of claim 1 in which said hub curves centrally toward said impeller plate.

4. The centrifugal pump of claim 1 in which the peripheral surfaces of said recess and hub are spaced and are provided with circumferential grooves and ridges the ridges of the hub projecting toward the grooves of the recess and said recess being provided at its lower part with a longitudinal groove opening to said impeller chamber.

5. The centrifugal pump of claim 4 in which said hub is provided with a ridge outside of said recess.

6. The centrifugal pump of claim 1 in which said hub has an annular recess at its end within the recess of said bearing side plate, and in which said recess of said bearing side plate has an annular deflecting plate projecting into the upper part of the end recess of said hub to deflect liquid to the lower part of said recess.

7. The centrifugal pump of claim 1 in which the impeller blades facing the bearing side wall extend to a greater radial distance than the impeller blades facing the inlet side wall.

8. The centrifugal pump of claim 1 in which said impeller plate curves from a central point facing said inlet toward said peripheral off-take wall to form a curved passage from said inlet toward said peripheral off-take wall.

9. A centrifugal pump comprising a casing having a peripheral off-take wall, a side wall having a central inlet and curving from said inlet to said peripheral off-take wall, a backing plate spaced from said side wall and secured to said peripheral off-take wall to form an impeller chamber, said backing plate having a bearing axially aligned with said inlet and a cylindrical recess axially aligned with said bearing between said bearing and said impeller chamber, a rotatable shaft extending through said bearing into said impeller chamber, an impeller in said impeller chamber comprising a plate rigidly mounted at its center on said shaft and curving from a central point facing said inlet symmetrically in said impeller chamber toward said peripheral off-take wall to form a flaring passage from said inlet to said peripheral off-take wall and spaced from said backing plate, said impeller having blades at angularly spaced intervals extending from opposite sides of said plate to slight clearance from said side wall and said backing plate, the blades on the face facing said backing plate extending to a greater radial distance from said shaft than the blades on the opposite face, said impeller having a hub extending into said recess, said hub having circumferential ridges and grooves within said recess and said impeller curving radially inwardly from said grooved portion toward said plate, said backing plate curving toward said impeller about said recess.

10. The centrifugal pump of claim 9 in which said hub is provided with a recess in its end about said shaft and said recess is provided with an annular deflector plate extending into the upper part of said end recess of said hub and delivers into the lower part of the recess in said backing plate.

11. The centrifugal pump of claim 9 in which the recess in said backing plate is provided with circumferential grooves and ridges axially off-set relative to those of said hub and a longitudinal groove in its lower part opening toward said impeller chamber.

THOMAS JAMES RIMBAULT DIBDIN.

References Cited in the file of this patent

UNITED STATES PATENTS

| Number | Name | Date |
|---|---|---|
| 1,379,380 | Anderson | May 24, 1921 |
| 1,937,461 | Mylting | Nov. 28, 1933 |
| 2,258,527 | Warman | Oct. 7, 1941 |
| 2,353,871 | Bowen | July 18, 1944 |
| 2,433,589 | Adams | Dec. 30, 1947 |